US010317538B2

(12) United States Patent
Liu et al.

(10) Patent No.: US 10,317,538 B2
(45) Date of Patent: Jun. 11, 2019

(54) CLOUD-OFFLOADED GLOBAL SATELLITE POSITIONING

(71) Applicant: Microsoft Technology Licensing, LLC, Redmond, WA (US)

(72) Inventors: Jie Liu, Medina, WA (US); Yuzhe Jin, Bellevue, WA (US); Ted C. Hart, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 887 days.

(21) Appl. No.: 14/011,140

(22) Filed: Aug. 27, 2013

(65) Prior Publication Data

US 2015/0061934 A1 Mar. 5, 2015

(51) Int. Cl.
*G01S 19/28* (2010.01)
*G01S 19/30* (2010.01)
*G01S 19/09* (2010.01)
*G01S 19/21* (2010.01)

(52) U.S. Cl.
CPC .............. *G01S 19/30* (2013.01); *G01S 19/09* (2013.01); *G01S 19/21* (2013.01); *G01S 19/28* (2013.01)

(58) Field of Classification Search
CPC .............................. G01S 19/215; G01S 19/28
USPC ..................................................... 342/357.69
See application file for complete search history.

(56) References Cited

U.S. PATENT DOCUMENTS

| 4,797,677 | A  | 1/1989  | MacDoran et al. |
| 5,119,102 | A  | 6/1992  | Barnard |
| 5,134,407 | A  | 7/1992  | Lorenz et al. |
| 6,104,338 | A  | 8/2000  | Krasner |
| 6,188,351 | B1 | 2/2001  | Bloebaum |
| 6,285,316 | B1 | 9/2001  | Nir et al. |
| 6,300,899 | B1 | 10/2001 | King |
| 6,313,786 | B1 | 11/2001 | Sheynblat |
| 6,417,801 | B1 | 7/2002  | van Diggelen |

(Continued)

FOREIGN PATENT DOCUMENTS

| CN | 1425226 | 6/2003 |
| CN | 103064092 | 4/2013 |

(Continued)

OTHER PUBLICATIONS

"International Preliminary Report on Patentability Issued in PCT Application No. PCT/US2014/052429", dated Sep. 28, 2015, 8 Pages.

(Continued)

*Primary Examiner* — Vladimir Magloire
*Assistant Examiner* — Helena H Seraydaryan
(74) *Attorney, Agent, or Firm* — Drinker Biddle & Reath LLP (57) ABSTRACT

Some implementations provide low power reduced sampling of global positioning system (GPS) locations. A server may be configured to assist a mobile device in determining a location from a plurality of small GPS signal chunks and corresponding time stamps. For instance, the server may identify a set of satellites from each of the GPS signal chunks and by comparing the set of satellites for each of the GPS signal chunks to each other to determine a second set of satellites. The server may then estimate a location of the mobile based on the second set of satellites.

20 Claims, 7 Drawing Sheets

(56) References Cited

U.S. PATENT DOCUMENTS

| | | |
|---|---|---|
| 6,448,925 B1 | 9/2002 | Shridhara |
| 6,466,164 B1 | 10/2002 | Akopian et al. |
| 6,546,040 B1 | 4/2003 | Eschenbach |
| 6,583,756 B2 | 6/2003 | Sheynblat |
| 6,642,884 B2 | 11/2003 | Bryant et al. |
| 6,700,533 B1 | 3/2004 | Werb et al. |
| 6,731,701 B2 | 5/2004 | Vorobiev et al. |
| 6,788,249 B1 | 9/2004 | Farmer et al. |
| 6,828,935 B1 | 12/2004 | Dunn et al. |
| 6,865,478 B2 | 3/2005 | Sirola et al. |
| 7,027,486 B2 | 4/2006 | Sullivan |
| 7,266,142 B2 | 9/2007 | Sullivan |
| 7,301,992 B2 | 11/2007 | Kohli et al. |
| 7,505,508 B2 | 3/2009 | Sullivan |
| 7,595,754 B2 | 9/2009 | Mehta |
| 7,623,067 B2 | 11/2009 | Raman et al. |
| 7,738,531 B2 | 6/2010 | Patrick |
| 7,821,455 B2 | 10/2010 | Chen et al. |
| 7,893,869 B2 | 2/2011 | Gaal et al. |
| 8,024,013 B2 | 9/2011 | Haartsen |
| 8,125,378 B1 | 2/2012 | Jarpenvaa |
| 8,259,010 B2 | 9/2012 | Ische et al. |
| 8,390,512 B2 | 3/2013 | Ische et al. |
| 8,462,831 B2 | 6/2013 | Sturza et al. |
| 2002/0005802 A1 | 1/2002 | Bryant et al. |
| 2002/0138198 A1 | 9/2002 | Morita |
| 2003/0152134 A1 | 8/2003 | Vorobiev et al. |
| 2004/0017311 A1 | 1/2004 | Thomas et al. |
| 2004/0230824 A1* | 11/2004 | Heil ............ G01S 19/21 726/26 |
| 2006/0152409 A1 | 7/2006 | Raman et al. |
| 2006/0208943 A1 | 9/2006 | Gronemeyer |
| 2007/0063894 A1 | 3/2007 | Yu |
| 2008/0252517 A1 | 10/2008 | Fuchs et al. |
| 2009/0128407 A1* | 5/2009 | Xie ............ G01S 19/20 342/357.58 |
| 2009/0318167 A1 | 12/2009 | Pon et al. |
| 2010/0117897 A1 | 5/2010 | Thomas et al. |
| 2010/0283673 A1 | 11/2010 | Farrokhi et al. |
| 2010/0318292 A1 | 12/2010 | Kulik et al. |
| 2011/0007783 A1* | 1/2011 | Weill ............ G01S 19/254 375/150 |
| 2011/0080320 A1 | 4/2011 | Farrokhi et al. |
| 2011/0103432 A1* | 5/2011 | Tangudu ............ G01S 19/21 375/150 |
| 2011/0279324 A1* | 11/2011 | Bolotski ............ G01S 19/30 342/451 |
| 2011/0298658 A1 | 12/2011 | Riley et al. |
| 2012/0146850 A1 | 6/2012 | Liu et al. |
| 2012/0249368 A1 | 10/2012 | Youssef et al. |
| 2013/0027245 A1 | 1/2013 | Lennen |
| 2014/0015713 A1 | 1/2014 | Liu et al. |

FOREIGN PATENT DOCUMENTS

| | | |
|---|---|---|
| CN | 103091687 | 5/2013 |
| JP | 2006132949 A | 5/2006 |
| JP | 2010121725 A | 6/2010 |
| JP | 2011179894 A | 9/2011 |
| RU | 2009127895 A | 1/2011 |

OTHER PUBLICATIONS

Chinese Office Action dated Dec. 8, 2015, for Chinese patent application No. 201380038013.1 (15 pages).

European Office Action dated Feb. 1, 2016, for European Patent Application No. 13741955.2 (7 pages).

Ya-peng, et al, "Waveform Design for Compressive Sensing Radar Based on Minimizing the Statistical Coherence of the Sensing Matrix", Journal of Electronics and Information Technology, vol. 33, No. 9, China Academic Journal Electronic Publishing House, Sep. 2011, pp. 2097-2102 (6 pages).

Kong, et al., "A Compressed Sensing Technique for GNSS Acquisition", ITM 2012, Proceedings of the 2012 International Technical Meeting of the Institute of Navigation, Feb. 1, 2012, pp. 356-361.

Muthuraman, et al., "Coarse Time Navigation: Equivalence of Algorithms and Reliability of Time Estimates", ITM 2012, Proceedings of the 2012 Internationa Technical Meeting of the Institute of Navigation, Feb. 1, 2012, pp. 1115-1138.

Othieno, et al., "Combined Doppler and Time-Free Positioning Technique for Low Dynamics Receivers", Plans 2012, Proceedings of IEEE/ION Plans 2012, The Institute of Navigation, Apr. 26, 2002, pp. 60-65.

PCT Search Report dated Sep. 27, 2013 for PCT application No. PCT/US2013/050747.

Office action for U.S. Appl. No. 13/550,454, dated Mar. 28, 2016, Liu et al., "Reduced Sampling Low Power GPS", 20 pages.

PCT Search Report dated Feb. 17, 2015 for PCT application No. PCT/US2014/062438.

International Search Report and Written Opinion Issued in PCT Patent Application No. PCT/US20141052429, dated Jan. 28, 2015, 17 Pages.

Second Written Opinion Issued in PCT Patent Application No. PCT/US2014/052429, dated Jun. 9, 2015, 6 Pages.

Chen, et al., "A Cross-Correlation Mitigation Method Based on Subspace Projection for GPS Receiver", In Proceedings of the 25th International Technical Meeting of the Satellite Division of the Institute of Navigation, Sep. 17, 2012, pp. 1428-1434.

Akopian et al, "A Fast Positioning Method Without Navigation Data Decoding for Assisted GPS Receivers," IEEE Transactions on Vehicular Technology, vol. 58, Issue 8, Oct. 2009, pp. 4640-4645.

Candes, "Compressive Sampling," Proceedings of the International Congress of Mathematicians, Madrid, Spain, Aug. 22-30, 2006, pp. 1-20.

Thor et al, "A Direct RF Sampling Multifrequency GPS Receiver," Position Location and Navigation Symposium, 2002 IEEE, Apr. 2002, pp. 44-51.

Office action for U.S. Appl. No. 13/550,454, dated Aug. 28, 2015, Liu et al., "Reduced Sampling Low Power GPS", 16 pages.

Ramos, et al., "LEAP: A Low Energy Assisted GPS for Trajectory-Based Services", UbiComp 2011, Sep. 17-21, 2011, Beijing, China (10 pages).

Chinese Office Action dated Aug. 17, 2016 for Chinese Patent Application No. 201380038013.1, a counterpart foreign application of U.S. Appl. No. 13/550,454, 11 pages.

European Office Action dated Sep. 23, 2016 for European Patent Application No. 13741955.2, a counterpart foreign application of U.S. Appl. No. 13/550,454, 7 pages.

Office Action for U.S. Appl. No. 13/550,454, dated Aug. 9, 2016, Jie Liu., "Reduced Sampling Low Power GPS", 23 pages.

Office Action for U.S. Appl. No. 14/067,744, dated Sep. 14, 2016, Liu et al., "High-Sensitivity GPS Device With Directional Antenna", 19 pages.

Chinese Office Action dated Nov. 28, 2016 for Chinese Patent Application No. 201480047380.2, a counterpart foreign application of U.S. Appl. No. 14/011,140 (10 pages).

Chinese Office Action dated Mar. 7, 2017 for Chinese Patent Application No. 201380038013.1, a counterpart foreign application of U.S. Appl. No. 13/550,454.

Chinese Office Action dated Apr. 20, 2017 for Chinese Patent Application No. 201480060131.7, a counterpart foreign application of U.S. Appl. No. 14/067,744.

Office Action for U.S. Appl. No. 14/067,744, dated Jan. 20, 2017, Liu et al., "High-Sensitivity GPS Device With Directional Antenna", 7 pages.

Office action for U.S. Appl. No. 13/550,454, dated Feb. 1, 2017, Liu et al., "Reduced Sampling Low Power GPS", 32 pages.

"Second Office Action and Search Report Issued in Chinese Patent Application No. 201480047380.2", dated Jun. 15, 2017, 10 Pages.

"Office Action Issued in Australian Patent Application No. 2014311494", dated Aug. 9, 2017, 2 Pages.

"Office Action Issued in Mexican Patent Application No. MX/a/2016/002592", dated Jan. 9, 2018, 6 Pages.

Bodhi et al., "Energy Efficient GPS Sensing with Cloud Offloading," SenSys '12, Nov. 6-9, 2012, Toronto, ON, Canada, 14 pages.

(56) References Cited

OTHER PUBLICATIONS

"Notice of Allowance Issued in Japanese Patent Application No. 2016-538992", dated Jun. 25, 2018, 3 Pages (W/o English Translation).

"Office Action and Search Report Issued in Russian Patent Application No. 2016106927", dated Apr. 13, 2018, 7 Pages. (W/o English Translation).

* cited by examiner

CLOUD-OFFLOADED GLOBAL SATELLITE POSITIONING

BACKGROUND

Global positioning systems (GPS) typically consist of a device including a GPS receiver and multiple GPS satellites. The GPS receiver is configured to receive and decode GPS signals broadcast from the GPS satellites in order to determine a location of the device. Each of the GPS satellite signals are transmitted with a satellite-specific encoding, which can be used by a GPS receiver to identify the broadcasting GPS satellite. The GPS receiver is able to calculate the location of the device by decoding the satellite signal, identifying the broadcasting GPS satellites, and performing a series of computations on the data extracted from the decoded signals.

Many devices today include GPS receivers and support applications that provide location based services. Typically, the GPS systems samples a GPS signal in the range of 30 seconds in order to accurately decode the GPS signal and identify the broadcasting GPS satellites. Unfortunately, sampling GPS signals is a power intensive process and many location-based applications available today on mobile devices require regular or continuous location sensing. Thus, while GPS receivers often provide the most accurate and reliable location information available to a mobile device, it is often the case that other sources are preferred. For example, mobile devices may obtain the location information from one of a variety of sources, including GPS receivers, cell-tower signals, FM radio signals, and/or WiFi signatures.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Implementations of a mobile device including a global positioning system (GPS) which can be used to determine a location of a mobile device are disclosed herein. In one example, the mobile device utilizes a server to aid in determining a location. For example, the mobile device includes a GPS receiver and a communication interface in communication with the server. The mobile device may sample GPS signals using the GPS receiver and provide the samples to the server for processing. In one example, the mobile device is configured to sample the GPS signals in one or more chunks of several milliseconds (ms) and the server is configured to process the chunks and determine a location of the mobile device.

BRIEF DESCRIPTION OF THE DRAWINGS

The Detailed Description is described with reference to the accompanying figures. In the figures, the left-most digit(s) of a reference number identifies the figure in which the reference number first appears. The same numbers are used throughout the drawings to reference like features and components.

DETAILED DESCRIPTION

The disclosed techniques describe implementations of a GPS system for determining locations related to mobile devices. In a typical system, when a GPS receiver is activated, the GPS receiver performs a series of power intensive steps to determine and maintain the location of the mobile device. First, the GPS receiver enters an acquisition phase. In the acquisition phase, the GPS receiver samples and decodes the GPS signal from each visible GPS satellite. The GPS signals include a time stamp and ephemeris data (data related to the location and trajectory of the transmitting satellite). Second, the GPS receiver performs a series of calculations based on the time stamp and ephemeris data extracted from the decoded GPS signals to determine an initial location. Third, the GPS receiver enters a tracking phase to maintain the location of the mobile device.

In order to sample and decode the entire signal from one or more GPS satellites, the GPS receiver is turned on for an interval, typically in the range of 30 seconds. The GPS receiver remains on for such a long period of time in part because the GPS satellites are configured to transmit data at a very low rate, typically in the range of 50 bits per second (bps) and around 32,000 samples are used to reconstruct the data contained in the GPS signals.

Next, the GPS receiver attempts to identify all GPS satellites in view of the mobile device (i.e., the GPS satellites which broadcast the received GPS signals). This is done by detecting the presence of one or more satellite-specific Coarse/Acquisition (C/A) codes in the GPS signals. Each GPS receiver stores a C/A code template, which includes the C/A code for all GPS satellites. The C/A codes are designed to be orthogonal to each other, such that when the template is compared with a GPS signal the C/A codes corresponding to visible GPS satellites cause a signal spike. Thus, the GPS receiver can compare the C/A template with the received GPS signals to determine which GPS satellites are initiating the broadcasts.

However when comparing the C/A code template to the GPS signals, the GPS receiver compensates for Doppler shifts in the GPS signal caused by movement of both the satellites and the GPS receiver. For example, a rising GPS satellite (a satellite coming into view of the mobile device) moves at a rate of up to 800 meters per second (m/s) toward the GPS receiver, causing a frequency shift of 4.2 kilohertz (kHz). Likewise, a setting GPS satellite (a satellite leaving view of the mobile device) moves at a rate of up to 800 m/s away from the GPS receiver, causing a frequency shift of −4.2 kHz. The GPS receiver needs to compensate for the Doppler shift within a certain margin of error (for example, within 500 Hz) to correctly identify the broadcasting GPS satellites using the C/A code template. Therefore to compensate for the motion of the GPS receiver in addition to the movement of the satellites, the GPS receiver often performs a number of Doppler shift calculations and corresponding C/A code comparisons before finalizing a determination of the visible GPS satellites.

To identify an initial location, the GPS receiver also determines the distance between the mobile device and each of the visible GPS satellites called the "pseudorange." The pseudorange can be calculated using the propagation delay of the GPS signals. The propagation delay is broken down into two parts, a millisecond part and a submillisecond part called the "code phase." The millisecond part can be decoded from the packet frames and the code phase can be determined by monitoring the 1 ms repetition of the C/A code in the GPS signals.

Once the GPS receiver has identified the visible satellites, decoded the GPS signals, and calculated the pseudoranges, the GPS receiver calculates an initial location. After the initial location is determined, the GPS receiver switches to a tracking phase to maintain the location of the mobile device. During the tracking phase, the GPS receiver attempts to adjust the Doppler frequencies and propagation delays to compensate for the shifts caused by further movement of the satellites and the mobile device over time. By performing tracking the GPS receiver is able to quickly and inexpensively (at a relatively low power consumption rate) estimate changes in position.

However, if the GPS receiver does not continuously perform the tracking calculations the GPS receiver is required to perform the acquisition phase anew, which as discussed above is power-intensive and time-consuming. Therefore, most GPS receivers are configured to always remain active and are not duty-cycled by the mobile device.

Figure 1:
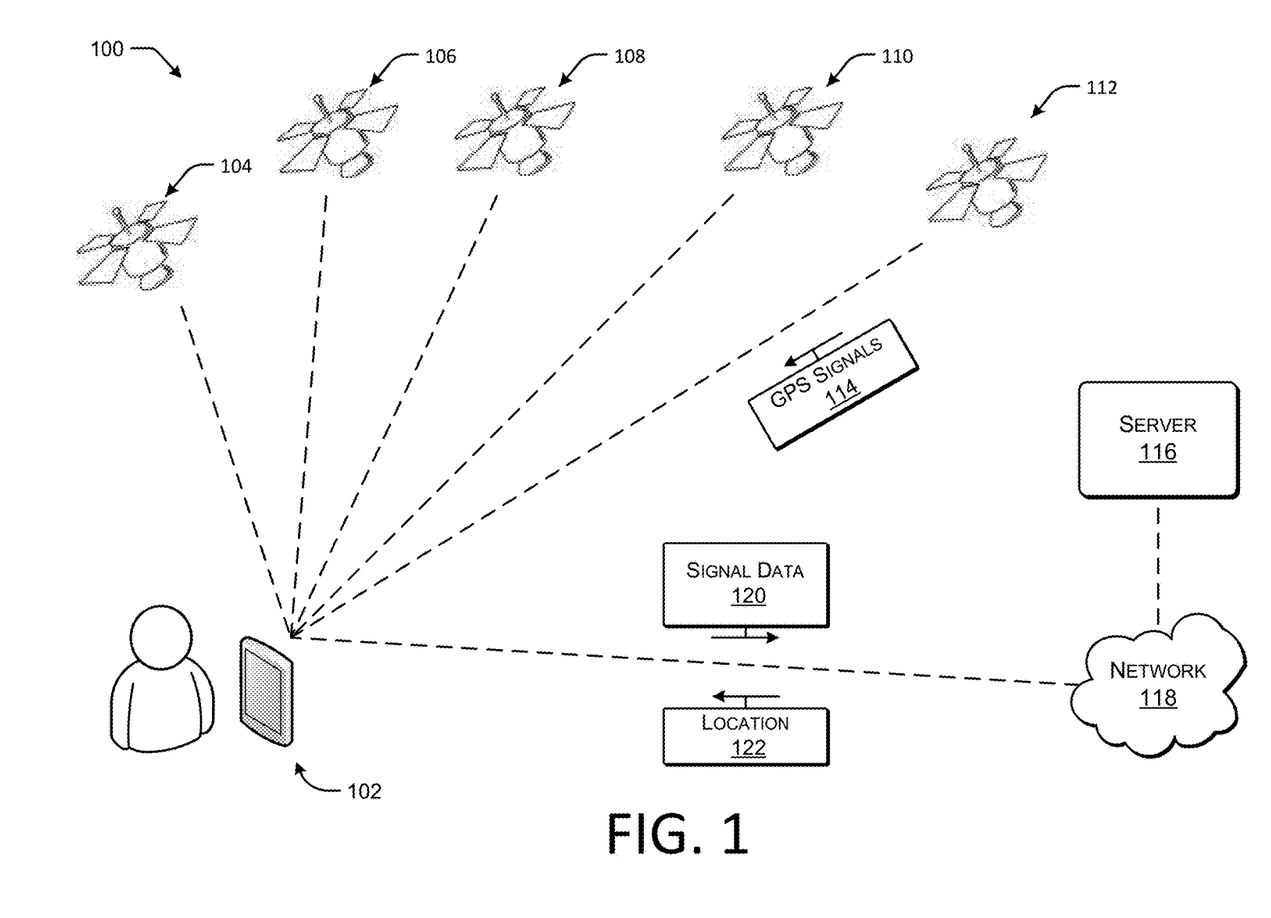
FIG. 1 is a pictorial view of an example of a GPS system according to some implementations.

FIG. 1 is a pictorial view of an example of a GPS system 100 according to some implementations. GPS system 100 includes mobile device 102 and GPS satellites 104, 106, 108, 110, and 112 from which mobile device may receive GPS signals 114. GPS system 100 also includes server 116 and network 118. Generally, mobile device 102 transmits and receives data to and from server 116 through network 118. Mobile device 102 may communicate with network 118 via wireless networks, such as a wireless local-area-network (WLAN), a short-range wireless network, such as Bluetooth®, or mobile networks provided through cell-towers, such as through code-division multiple access (CDMA) systems.

Mobile device 102 can be any GPS-enabled device such as a cell phone, smart phone, navigation device, tracking sensor, GPS sensor, or any other devices including a GPS receiver. In the present example, mobile device 102 is illustrated as a smart-phone.

GPS satellites 104-112 may comprise any of the satellites associated with the GPS satellite navigation (sat-nav) system. Additionally, although shown as five satellites, navigation satellites 104-112 represent any number of navigation satellites from which mobile device 102 can receive a GPS signal. GPS satellites 104-112 are uniquely identifiable by a satellite specific C/A code, as discussed above. Generally, GPS satellites 104-112 transmit GPS signals useful for geo-spatial positioning The GPS signals 114 are encoded and include time-based information useful for calculating position.

Mobile device 102 receives GPS signals 114 from GPS satellites that are visible to mobile device 102 from a mobile device 102 current location (are in line-of-sight of mobile device 102). In some cases GPS signals 114 received by mobile device 102 may be diffracted, reflected, and/or attenuated by various obstructions.

Mobile device 102 includes a GPS receiver, which is configured to sample GPS signals 114 from satellites 104-112 to generate a GPS signal sample. A GPS signal sample comprises one or more contiguous measurements of the GPS signal 114 as captured by the mobile device 102. Each separate contiguous range within the sample is termed a "chunk" and will be of at least 1 ms duration. If there is more than one chunk within a sample then there will be some proper sampling interval between them. In some examples, mobile device 102 may be configured to compress, process, or otherwise manipulate GPS signal samples before providing the signal data 120 to server 116. For example, the mobile device 102 may provide the server 116 the raw GPS signals 114, a compressed version of the GPS signals 114 or data obtained from the GPS signals 114, such as the IDs of the visible satellites and/or the code phases and Doppler frequencies associated with the visible satellites.

Mobile device 102 provides GPS signal data 120 to server 116 via network 118. In some examples, mobile device 102 is a GPS sensor or GPS tracking device that does not include a wireless or mobile communication interface and, thus, mobile device 102 is unable to provide the GPS signal data 120 to server 116 in real time (as the GPS signal is received). In this example, mobile device 102 may store the GPS signal data 120 as data on a computer-readable storage media incorporated into mobile device 102. The data is uploaded to server 116 at a later time, such that the previous location(s) of mobile device 102 may be determined or reconstructed at the time of upload.

Once server 116 receives the GPS signal data 120 from mobile device 102, server 116 determines an initial location of mobile device 102 and returns location information 122 via network 118 to mobile device 102. By using server 116 to determine the initial location, mobile device 102 is able to conserve the energy typically consumed during the power-intensive acquisition phase, extending overall battery life.

In this example, mobile device 102 provides the GPS signal data 120 to server 116 as raw GPS samples with no preprocessing preformed on mobile device 102. In an alternative example, mobile device 102 may decode, encrypt or compress the GPS signal data 120 before providing it to server 116.

When the server 116 receives the GPS signal data 120, the server 116 performs acquisition on the chunks to identify a set of visible satellites, such as satellites 104-112. In one particular example, to identify the visible satellites 104-112 from such small chunks, the server 116 utilizes a technique called sparse signal recovery. In this example, the server 116 first initializes a set of visible satellites as an empty set (i.e., initially the server 116 has not identified any of the C/A code templates in the chunks received from the mobile device). Next the server 116, searches the GPS signal 114 over all of the possible satellite IDs, code phases and Doppler frequency combinations to select the satellite with the strongest GPS signal sampled by the mobile device 102. For instance, the server 116 may iterate through the C/A code templates at possible Doppler frequencies and code phases for each satellite to identify the strongest GPS signal.

Once a satellite is selected, the server 116 removes the GPS signal associated with the selected satellite from the chunk and adds the selected satellite to the set of visible satellites. For example, the server 116 may remove the GPS signal associated with the selected satellite from the original chunk by performing a projection onto an appropriate signal subspace determined by the C/A code templates of the selected satellites. The server 116 continues the process of selecting a satellite with the strongest signal and removing the signal associated with the selected satellite until either a stopping criteria is met (e.g., enough satellites are identified that the location of the mobile device 102 may be calculated), all visible satellites are identified or the remaining signals are not strong enough to reliably identify the broadcasting satellites.

Once a set of visible satellites is determined, the server 116 correlates the set of visible satellites over multiple chunks. Because the chunks are so small (for example, 2 ms in length), unexpected radio interference or other noise can severely degrade the GPS signal as collected by the mobile device 102 and cause satellites to be incorrectly detected within a single chunk. Thus, by collecting multiple chunks with various gaps and comparing the identified satellites in each chunk the overall accuracy of the determined location 122 may be improved.

Therefore, each satellite in the set of visible satellites identified using a single chunk may be a good (i.e., a visible satellite), a bad (i.e., a false identification), or an unknown (i.e., cannot be classified as either a good or bad identification). In one example, the server 116 sets each satellite in the set of visible satellites for each chunk of the GPS signal 114 to a status of "unknown." The server 116 determines the good and bad satellites by comparing the data associated with each satellite across all of the chunks. For instance, in one implementation, the server 116 calculates the differences of the code phases as detected for each satellite over all of the chunks and if the differences are less than a first threshold, the server identifies the satellite as "good" and if the differences are greater than a second threshold identifies the satellite as "bad." The remaining satellites and any satellite that was only visible in a single chunk are then labeled as "unknown."

Using the good satellites, the location 122 may be estimated. For example, the server 116 may calculate the location of mobile device 102 using the time that the chunks were collected, the good satellites' IDs, the ephemeris related to the good satellites (which may be obtained from the NASA orbital database or decoded from the GPS signal 114) and the pseudoranges.

Although described with respect to GPS, any of the techniques described herein may be implemented in association with other global or regional satellite navigation systems. In some cases, these techniques are used with sat-nav receivers capable of receiving signals from two or more different satellite navigation systems. By way of example, other global and/or regional satellite navigation systems may include Global Navigation Satellite System (GLONASS), Galileo, BeiDou, Compass, Indian Regional Navigation Satellite System (IRNSS), or Quasi-Zenith Satellite System (QZSS), among others.

Figure 2:
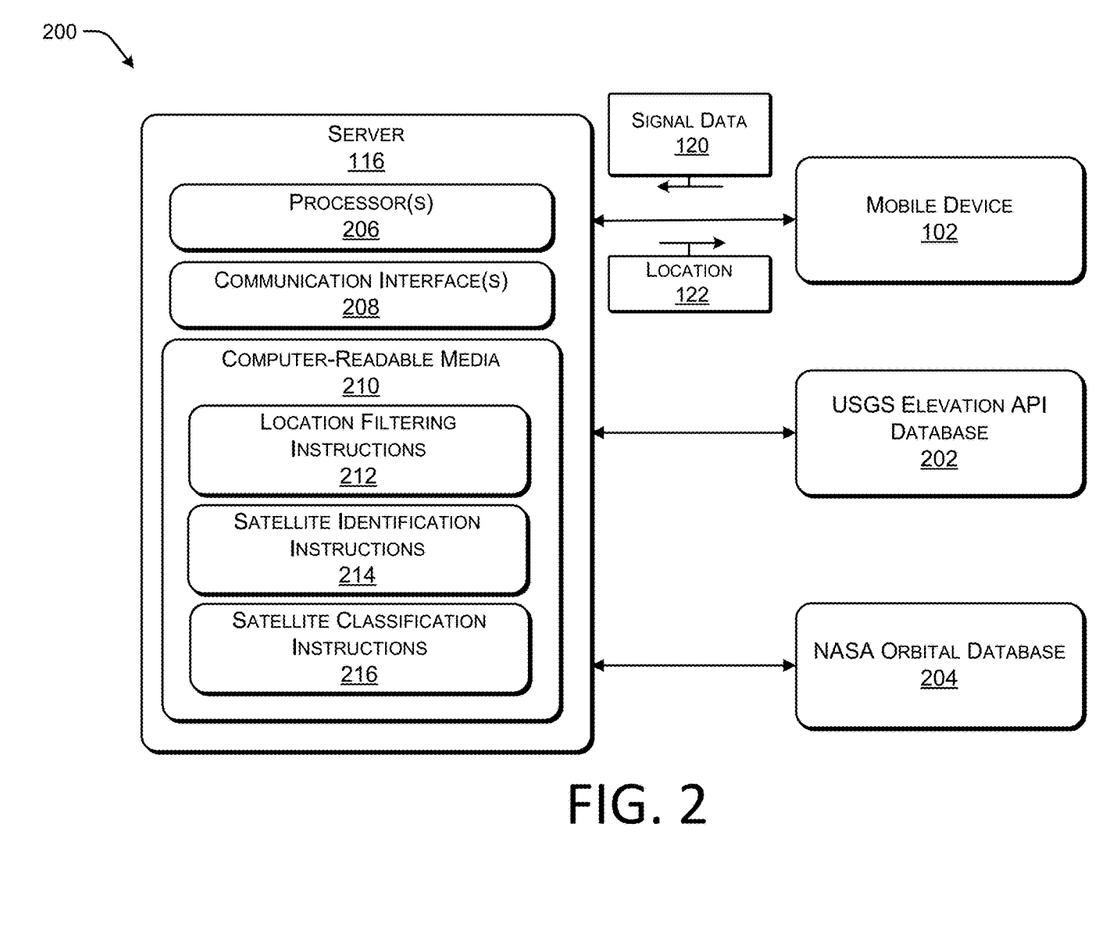
FIG. 2 is a block diagram of an example framework of a GPS system according to some implementations.

FIG. 2 is a block diagram of an example framework of a GPS system 200 according to some implementations. GPS system 200 includes mobile device 102, server 116, United States Geological Survey (USGS) elevation API database 202 and NASA orbital database 204.

Mobile device 102 includes one or more GPS receivers to sample GPS signals and one or more communication interfaces to provide the GPS signal data 120 to server 116 and receive location information 122 in return. Server 116 includes one or more processors 206, a communication interface 208, and computer-readable storage media 210. Communication interfaces 208 are accessible by processors 206 to communicate data to and from mobile device 102 over a network, such as network 118 of FIG. 1.

Any number of program modules, applications, or components can be stored in the computer-readable storage media 210, including by way of example, location filtering instructions 212, satellite identification instructions 214 and satellite classification instructions 216. The location filtering instructions 212 are stored in computer-readable storage media 210 and are executable by processors 206 to cause server 116 to determine a location of mobile device 102 based on a set of good satellites. The satellite identification instructions 214 are executable by processors 206 to cause server 116 to identify a set of visible satellites from the GPS signal data 120. The satellite classification instructions 216 are executable by processors 206 to cause server 116 to identify a set of good satellites from the set of visible satellites, as determined by the satellite identification instructions 214.

As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other tangible medium that can be used to store information for access by a computing device.

In contrast, communication media may embody computer-readable instructions, data structures, program modules, or other data in a modulated data signal, such as a carrier wave. As defined herein, computer storage media does not include communication media.

USGS Elevation API database 202 is accessible by server 116 via communication interfaces 208, such that server 116 is able to retrieve elevation data related to a location determined by server 116. Typically, server 116 provides latitude and longitude coordinates to USGS elevation API database 202 and receives elevation data related to the coordinates in return.

NASA Orbital database 204 is also accessible by server 116 via communication interfaces 208 and is used to retrieve almanac and ephemeris data related to the GPS satellites 104-112. Almanac data relates to the coarse orbit and status of satellites in Earth's orbit. Ephemeris data is related to the position and trajectory of the satellites.

USGS Elevation API database 202 and NASA orbital database 204 are two examples of a variety of databases from which server 116 may retrieve elevation, almanac, and ephemeris data. For example, US Geodetic Survey computes the orbits, position, and trajectory of GPS satellites and makes the orbits, position, and trajectory publically available on the web.

In an example, mobile device 102 provides GPS signal data 120 including multiple chunks of raw GPS signal and time stamps corresponding to when the GPS signal was sampled to server 116 via at least one of communication interfaces 208. In some cases, GPS signal data 120 is downloaded from mobile device 102 and in others, the GPS signal data 120 is received via a wireless or mobile network from mobile device 102.

Once GPS signal data 120 is received, location filtering instructions 212 cause processors 206 to determine the location of mobile device 102. To calculate the location of mobile device 102, server 116 needs to determine the time that the GPS signal was sampled, the broadcasting (visible) GPS satellites, the ephemeris related to the visible satellites, and the pseudoranges.

In an example, server 116 identifies which GPS satellites are visible to the mobile device 102 by executing the satellite identification instructions 214 and the satellite classification instructions 216. When executed the satellite identification instructions 214 perform acquisition on each of the chunks received in the GPS signal data 120 to identify a set of visible satellites. In one implementation, the satellite identification instructions 214 first initialize a set of visible satellites to an empty set for each chunk, as initially the mobile device 102 has not detected any of the C/A code templates. Next, for each chunk, the satellite identification instructions 214 search the GPS signal over all of the possible satellite IDs, code phases and Doppler frequency combinations to select the satellite with the strongest signal sampled by the mobile device 102. As described above, the satellite identification instructions 214 may iterate through the C/A code templates at possible Doppler frequencies and code phases for each satellite to identify the strongest signal.

Once a satellite is selected, the GPS signal associated with the selected satellite is removed from the chunk and the selected satellite is added to the set of visible satellites. For example, the satellite identification instructions 214 may remove the GPS signal associated with the selected satellite from the chunk by performing a projection onto an appropriate signal subspace determined by the C/A code templates of the selected satellites.

The satellite identification instructions 214 repeat the process of selecting a strongest signal until a stopping criterion is met. For example, the stopping criteria may be met when the identification of a predetermined number of satellites is achieved (e.g., enough satellites are identified that the location of the mobile device 102 may be calculated), all visible satellites are identified and/or the remaining signals in the chunk are not strong enough to reliably identify the broadcasting satellites. Matching pursuit and orthogonal matching pursuit algorithms are examples of this procedure. In this manner, a set of visible satellites may be determined for each chunk of the GPS signal 114 provided by the mobile device 102.

Once a set of visible satellites is determined, the satellite classification instructions 216 causes the servers 116 to correlate the set of visible satellites over multiple chunks. Because the chunks are so small (for example, 2 ms in length), unexpected radio interference or other noise can severely degrade the GPS signal and cause satellites to be incorrectly detected within a single sample. Thus, by collecting multiple chunks with various gaps and comparing the identified satellites in each chunk the overall accuracy of the determined location 122 may be improved.

As discussed above, each satellite in the set of visible satellites identified using a single chunk may be good (i.e., a visible satellite), bad (i.e. a false identification), or unknown (i e cannot be classified as either a good or bad identification). In one example, the satellite classification instructions 216 sets each satellite in the set of visible satellites for each chunk received as part of the GPS signal data 120 to a status of "unknown."

The satellite classification instructions 216 determine the good and bad satellites by comparing the data associated with each satellite across all of the chunks. For instance, in one implementation, the satellite classification instructions 216 cause the server 116 to calculate the differences of the code phases as detected for each sample corresponding to a particular satellite. If the differences are less than a first threshold, the satellite are classified as "good" and if the differences are greater than a second threshold the satellite are classified as "bad". The remaining satellites (i.e., the satellites greater than the first threshold but less than the second threshold) and any satellite that was visible in only one sample are classified as "unknown." To estimate the location 122 using the "good" satellites, the server 116 first determines the time each GPS signal was sampled by the mobile device 102, the ephemeris associated with the good satellites and the pseudoranges.

In one implementation, the time is received from mobile device 102 as a time stamp provided by the mobile device 102, as part of the GPS signal data 120. In another implementation, the time can be extracted from the GPS signal. The time extracted from the GPS signal is typically more accurate, however, the time stamp applied by the mobile device 102 at the time of sampling is sufficient to calculate an initial location 122 within a reasonable range (i.e., within a few meters).

The ephemeris may be retrieved by server 116 from NASA orbital database 204. In one particular implementation, server 116 may fetch the ephemeris from NASA orbital database 204 periodically and store the information in computer-readable storage media 210 for use at a later time, such as in the case where the GPS signals were sampled and stored on mobile device 102 and downloaded to server 116 after a period of time. In other implementations, the location filtering instructions 212 may cause the server 116 to decode the GPS signal to determine the ephemeris data.

Once the ephemeris and time are identified by the server 116, the location filtering instructions 212 cause the server 116 to calculate the pseudorange (i.e., code phases and propagation delay) for each of the good satellites using the ephemeris data and the GPS signals. For instance, the server 116 may determine the propagation delay using a technique called coarse-time navigation (CTN) if a reference location (such as a cell phone tower) within 150 kilometers (km) of the location 122 of mobile device 102 may be identified.

Once the time stamps, code phases and propagation delay for each satellite are determined, the location filtering instructions 212 cause the server 116 to estimate the location 122 of mobile device 102. However, in some instances, too few good satellites may be identified to accurately estimate a location 122 of the mobile device 102. If too few good satellites are identified to determine a location 122, the location filtering instructions 212 enumerate through the visible satellites classified as "unknown" and add each one to the set of good satellites and attempt to identify a location 122. A location estimated using bad (i.e., incorrectly identified) satellites will have an erroneous, impossible or incorrect position (such as at elevations far above or below the surface of the Earth). Thus, the location filtering instructions 212 test the location 122 estimated after adding each satellite to eliminate erroneous locations. For example, constraining the location 122 to an elevation range near the surface of the Earth, such as between 500 to 8000 meters (m) results in the elimination of many erroneous locations.

Unfortunately, applying an elevation range by itself may not detect all erroneous locations. To eliminate the remaining erroneous locations, the location filtering instructions 212 may cause the server 116 to access the USGS elevation API database 202 via communication interfaces 208. Server 116 retrieves the true elevation of the Earth's surface for each of the remaining estimated locations 122 using the latitude and longitude coordinates. The location filtering instructions 212 compare the determined elevation to the true elevation and eliminate any location where the elevations do not match. However, when an elevation matches the USGS elevation data, the actual location 122 of mobile device 102 at the time the GPS signals were sampled has been identified and may be returned to the mobile device 102 as the location 122. It should be understood that using the USGS elevation API database 202 and comparing elevations is one possible technique for identifying erroneous locations and that other techniques may be utilized.

In some instances, enough good satellites may be identified to allow location 122 to be estimated while some satellites are still labeled as "unknown." By using those unknown satellites, the accuracy of the estimated location 122 may be improved. For example, each of the unknown satellites may be added to the set of good satellites while a new location is estimated and checked, for instance, using the USGS elevation data, as discussed above. In another instance, the new location estimated using the unknown satellite may be compared to the original location and if the two locations are within a threshold distance, the unknown satellite may be considered "good" and the new location returned to the mobile device 102 as the location 122. This process may be continued until all remaining unknown satellites which may be labeled as "good" have been tested.

Once the final location 122 of mobile device 102 is identified, the location 122 is provided to mobile device 102. In an alternative implementation, the location 122 can be stored in a computer-readable storage media for later analysis or provided to a display for use, for example, in scientific research.

Figure 3:
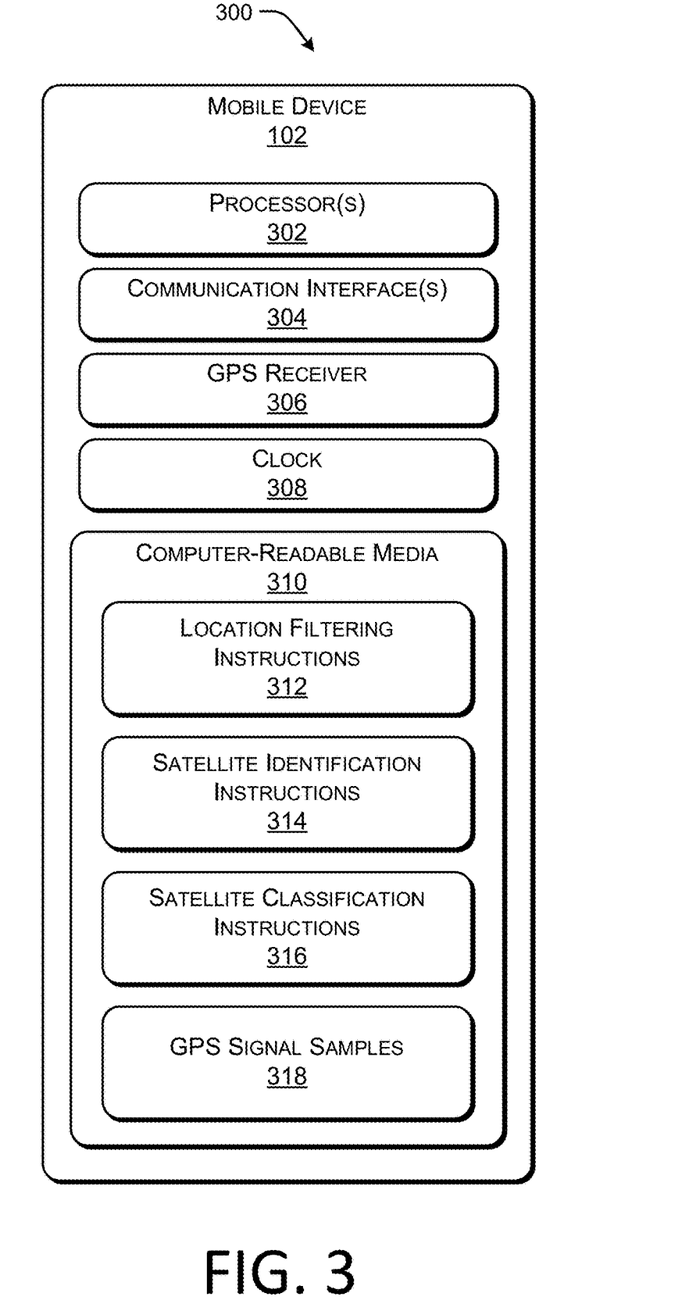
FIG. 3 is a block diagram of an example framework of a mobile device according to some implementations.

FIG. 3 is a block diagram of an example framework 300 of mobile device 102 according to some implementations. Mobile device 102 includes one or more processors 302, one or more communication interfaces 304, GPS receiver 306, clock 308, and computer-readable storage media 310. Computer-readable storage media 310 is illustrated as storing location filtering instructions 312, satellite identification instructions 314, satellite classification instructions 316 and one or more GPS signal samples 318.

Communication interfaces 304 are utilized to communicate data to a server, such as server 116 of FIGS. 1 and 2. Communication interfaces 304 is configured to communicate with wireless networks, such as a wireless local-area-network (WLAN), short-range wireless networks, such as Bluetooth®, a mobile network provided through cell-towers, such as through CDMA systems, or over a wired connection, such as via a universal serial bus (USB) interface.

GPS receiver 306 is configured to receive GPS signals from one or more satellites, such as satellites 104-112. Although shown as integrated with mobile device 102, GPS receiver 306 may be external, but local. An external GPS receiver may communicate with mobile device 102 over a wired (e.g. USB) or wireless interface (e.g. Bluetooth®). In some cases, GPS receiver 306 is integrated with one of the communication interfaces 304. This integrated module provides cellular connectivity and GPS functionality. In some examples, an antenna of the integrated module is shared by the cellular and GPS sub-systems.

Clock 308 is configured to provide a time stamp that is associated with the time a GPS signal sample is received by GPS receiver 306. In one example, clock 308 is a WWVB receiver. WWVB is a radio station, which broadcasts universal time signals around the globe via a continuous 60 kHz carrier wave, derived from a set of atomic clocks located at the transmitter sites.

In an example, GPS receiver 306 periodically samples GPS signals from satellites 104-112 and each of the GPS signal samples 318 are time stamped by clock 308. Time stamped GPS signal samples 318 are either stored in computer-readable storage media 310 or provided to server 116 via communication interfaces 304, as GPS signal data 120. If GPS signal samples 318 are provided to server 116, then mobile device 102 may receive a location from server 116 in response. If GPS signal samples 318 are stored then the signals 318 may be downloaded or provided to server 116 at a later time or the mobile device 102 may utilize the samples to identify a location.

In some implementations, GPS signal samples 318 are provided to the server 116 as raw samples. In other implementations, the location processing may be split between the server 116 and the mobile device 102 and a set of visible satellites and associated code phases and Doppler frequencies may be provided to the server 116. In some instances, the GPS signal samples 318 or signal data may be compressed before transmission.

The mobile device 102 may be used in an environment or in a configuration of universal or specialized computer systems. Examples include a personal computer, a handheld device or a portable device, a tablet device, a multi-processor system, a microprocessor-based system, a programmable customer electronic device, a network PC or other devices with location based systems.

In one particular implementation, the mobile device 102 may identify a location without the aid of a server. For instance, the GPS receiver 306 may sample the GPS signal being broadcast by one or more visible satellites. The GPS signal samples 318 may be very short. The mobile device 102 time stamps each GPS signal sample 318 using the clock 308 and once enough samples are collected the mobile device partitions the GPS signal samples 318 into small chunks (such as 1 or 2 ms in length) and performs acquisition on the chunks to identify a set of visible satellites.

For each chunk, the mobile device executes the satellite identification instructions 314 to identify a set of visible satellites. The mobile device 102 first initializes a set of visible satellites as an empty set (i.e., initially none of the C/A code templates have been detected in the chunk). Next the mobile device 102 searches the chunk over all of the possible satellite IDs, code phases and Doppler frequency combinations to select the satellite with the strongest GPS signal. For instance, the mobile device 102 may iterate through the C/A code templates at possible Doppler frequencies and code phases for each satellite to identify the strongest GPS signal.

Once a satellite is selected, the mobile device 102 removes the GPS signal associated with the selected satellite from chunk and adds the selected satellite to the set of visible satellites. For example, the mobile device 102 may remove the GPS signal associated with the selected satellite from the chunk by performing a projection onto an appropriate signal subspace determined by the C/A code templates of the selected satellites. The mobile device 102 continues the process of selecting a strongest signal and removing the signal associated with the satellite broadcasting the strongest signal until a stopping criterion is met. For example, the stopping criteria may be met when a predetermined number of satellites are classified as "good" (e.g., enough satellites are identified that the location of the mobile device 102 may be calculated), all visible satellites have been considered or the remaining signals in the chunk are not strong enough to reliably identify the broadcasting satellites. Matching pursuit and orthogonal matching pursuit algorithms are examples of this procedure.

Once a set of visible satellites is determined, the mobile device 102 executes the satellite classification instructions 316 to correlate the set of visible satellites over multiple chunks. In one example, the mobile device 102 sets each satellite in the set of visible satellites to a status of "unknown." The mobile device 102 then determines the good and bad satellites by comparing the data associated with each satellite across all of the chunks. For instance, in one implementation, the mobile device 102 calculates the differences of the code phases as detected for each satellite over all of the chunks and if the differences are less than a first threshold, the server identifies the satellite as "good" and if the differences are greater than a second threshold, identifies the satellite as "bad." The remaining satellites (those greater than the first threshold and less than the second threshold) and any satellites that were detected in only one chunk are classified as "unknown."

Using the "good" satellites, the mobile device 102 determines the location by executing the location filtering instructions 212. For example, the mobile device 102 may calculate the location using the time stamps provide by the clock 308, the set of good satellites IDs, the ephemeris related to the visible satellites (which may be obtained from the NASA orbital database or decoded from the GPS signal samples 318) and the pseudorange. For instance, the propagation delay may be calculated using the ephemeris, a reference location (such as a cell phone tower) within 150 km of the mobile device 102 and the time stamp using a technique called coarse-time navigation (CTN).

FIGS. 4-7 are flow diagrams illustrating example processes for determining a location of a mobile device, such as mobile device 102 of FIGS. 1-3. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 4:
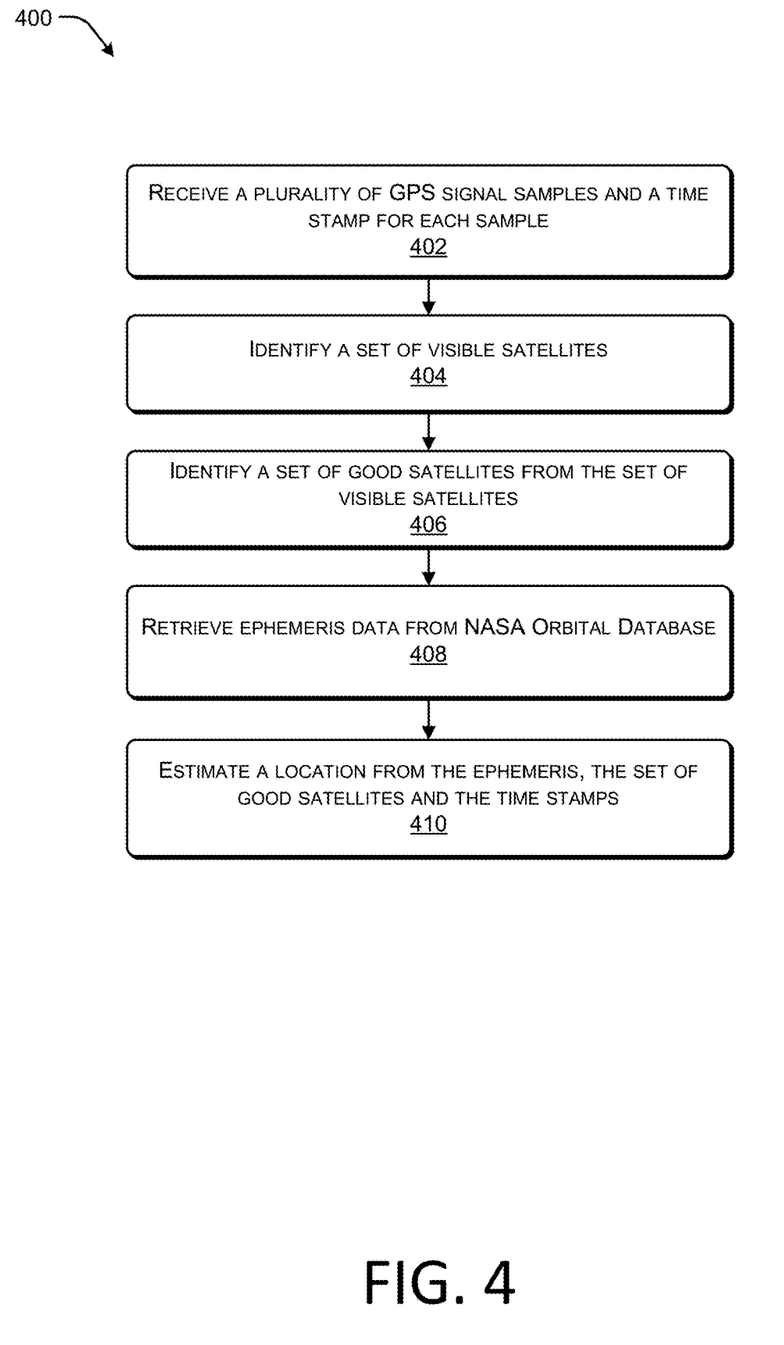
FIG. 4 is a flow diagram of an example process for estimating a location of a mobile device according to some implementations.

FIG. 4 is a flow diagram of an example process 400 for estimating a location of a mobile device (such as mobile device 102 of FIGS. 1-3) according to some implementations. At 402, a server receives a plurality of GPS signal samples and a time stamp for each sample from the mobile device. For example, the mobile device may collect and transmit multiple chunks of raw GPS signals sampled at various intervals. In some instances, the length of the sample and/or the intervals may vary. For example, the server may receive one or more long GPS signal samples, which the server divides into chunks. In some implementations, the servers may download the GPS signal samples from the mobile device at time other than the time that the GPS signal samples were collected.

At 404, the server identifies a set of visible satellites from the chunks. For example, the server may search each chunk over all of the possible satellite IDs, code phases and Doppler frequency combinations to select the satellites with the strongest signal. For instance, the server may iterate through the C/A code templates at possible Doppler frequencies and code phases for each satellite to identify the strongest signal.

Once a strongest satellite is selected, the server removes the GPS signal associated with the strongest satellite from the chunk and adds the selected satellite to a set of visible satellites. For example, the server may remove the GPS signal associated with the selected satellite by performing a projection onto an appropriate signal subspace determined by the C/A code templates of the selected satellites. The server continues to repeat the process of selecting a satellite with the strongest signal and removing the signal associated with that satellite until either a stopping criterion is met (e.g., enough satellites are identified that the location of the mobile device may be calculated, all visible satellites are identified or the remaining signals in the chunk are not strong enough to reliably identify the broadcasting satellites). Matching pursuit and orthogonal matching pursuit algorithms are examples of this procedure. In this manner, a set of visible satellites may be determined for each chunk.

At 406, the server identifies a set of good satellites from the set of visible satellites. The server identifies the good satellites by correlating the set of visible satellites over multiple chunks and classifying each visible satellite as either good (i.e., a visible satellite), bad (i.e. a false identification), or unknown (i.e. cannot be classified as either good or bad). For example, the server may initially set each visible satellites to a status of "unknown." The server determines the good and bad satellites by comparing the data associated with each satellite across all of the chunks. For instance, the server may calculate the differences between the code phases of each chunks. The server may compare the differences to a first threshold and if the differences are less than the first threshold, the server may identify the satellite as "good." However, if the differences are greater than the first threshold the server may compare the differences to a second threshold and if the differences are greater than the second threshold, identify the satellite as "bad." The server may classify the remaining satellites (i.e., the satellites with code phase differences greater than the first threshold and less than the second threshold), as well as any satellite that was visible in only one chunk as "unknown."

At 408, the server retrieves ephemeris data from NASA Orbital Database. In one particular example, the server may retrieve ephemeris and almanac data from NASA orbital database periodically and store the information in a memory, such as computer-readable storage media 310, for use at a later time. Storing the ephemeris and almanac data is particularly useful when the GPS signal samples are collected, stored on mobile device for a period of time, and downloaded to server later.

At 410, the server may estimate a location of the mobile device from the ephemeris, the set of good satellites, the time stamps and the pseudoranges. For instance, the server may calculate the propagation delay by calculating the CTN using a reference location. The server may then provide the location back to the mobile device or to one or more databases for scientific research.

Figure 5:
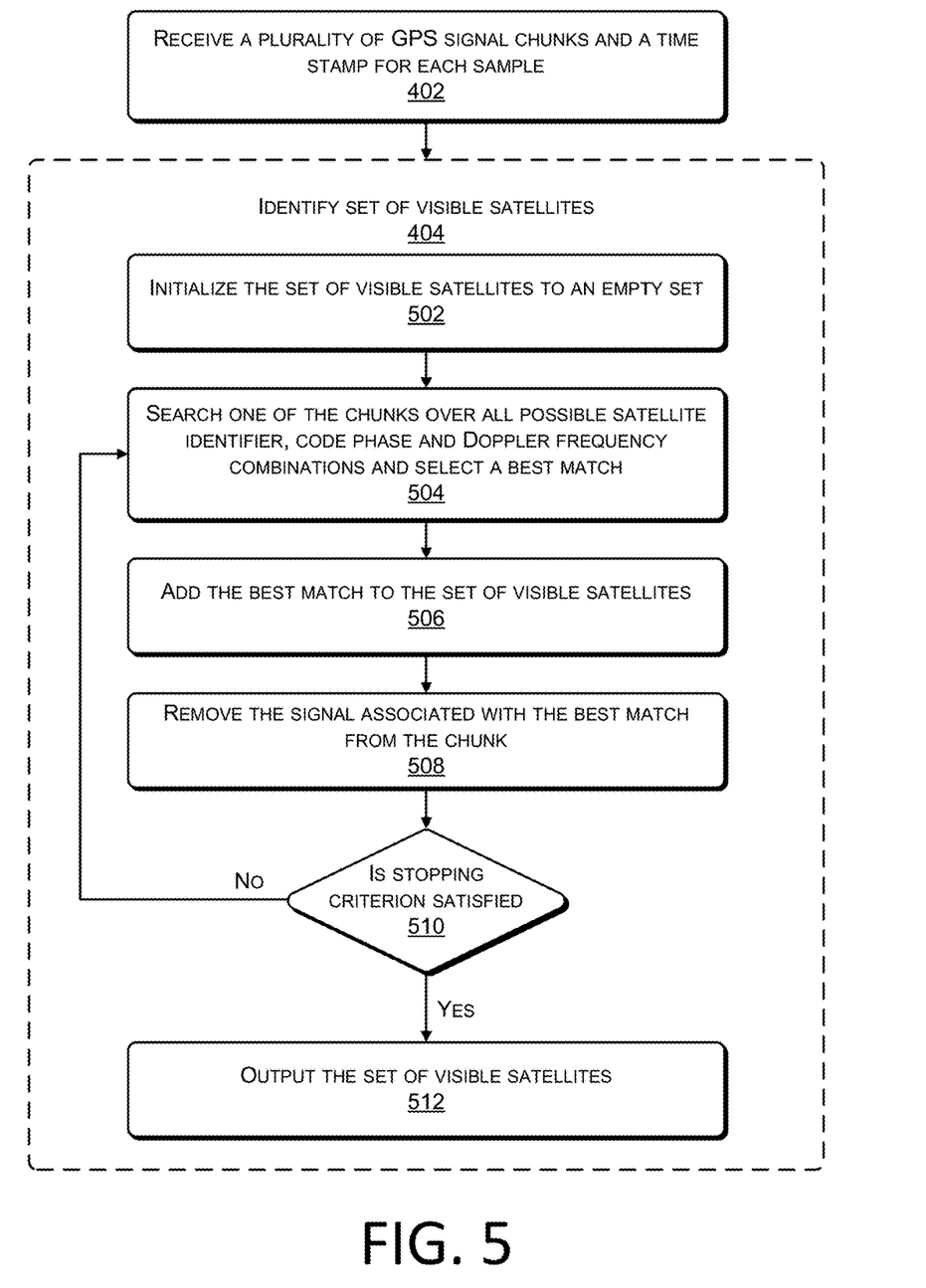
FIG. 5 is a flow diagram of an example process for identifying a set of visible satellites according to some implementations.
Figure 6:
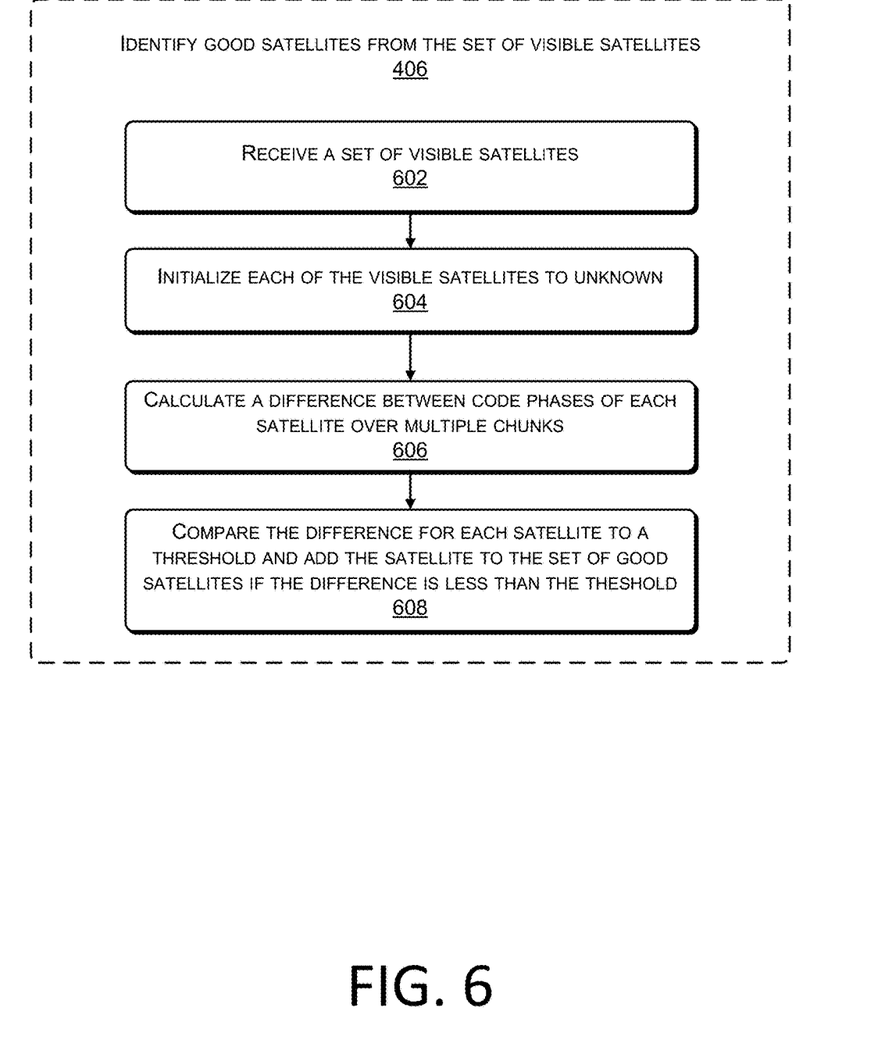
FIG. 6 is a flow diagram of an example process for selecting a set of good satellites from a set of visible satellites according to some implementations.

FIG. 4 provides an example process 400 for estimating a location of a mobile device by identifying a set of satellites from a series of GPS signal sample chunks. FIGS. 5 and 6 provide more details as to possible implementations for identifying the set of satellites.

FIG. 5 is a flow diagram of an example process 500 for identifying a set of visible satellites according to some implementations. At 502, the server initializes a set of visible satellites to an empty set (i.e., initially the server has not identified any of the C/A code templates in the GPS signal chunks received from the mobile device).

At 504, the server searches one of the GPS signal chunks over all possible satellite identifiers, code phases and Doppler frequency combinations and selects a best match. The best match may be selected by identifying the satellite with the strongest signal within the chunk. For instance, the server may iterate through the C/A code templates at possible Doppler frequencies and code phases for each satellite to identify the strongest signal.

At 506, the server adds the best match (i.e., the satellite with the strongest signal in the sample) to the set of visible satellites. For example, the set of visible satellites may be expressed as follows:

$$X^{(k)} = X^{(k-1)} \cup \{x^{(k)}\}$$

where $X^{(k)}$ denotes the set of visible satellites, $x^{(k)}$ is the best match and k is the number of iterations through process 500.

At 508, the server removes the GPS signal associated with the best match from the chunk. For example, the server may remove the GPS signal associated with the selected satellite by performing a projection onto an appropriate signal subspace determined by the C/A code templates of the selected satellites.

In matching pursuit, the new signal, $r^{(k)}$, can be calculated using the previous sample, $r^{(k-1)}$, as follows:

$$r^{(k)} = r^{(k-1)} - \frac{x^{(k)} \times x^{(k)T} \times r^{(k-1)}}{(\|x^{(k)}\|_2)^2}$$

where $x^{(k)}$ is again the best match and k is the number of iterations through process 500. In orthogonal matching pursuit, the new signal, $r^{(k)}$, can be calculated using the previous sample, $r^{(k-1)}$, as follows:

$$r^{(k)} = r^{(k-1)} - P_x^{(k)} \times r^{(k-1)}$$

where $P_x^{(k)}$ is the orthogonal projection onto the subspace spanned by all the previously identified C/A code templates up to the current iteration k.

At 510, the server determines if a stopping criterion is satisfied. For example, the stopping criteria may be a predetermined number of satellite identifications (i.e., enough satellites have been identified that the location of the mobile device may be calculated), all visible satellites are identified or the remaining signals in the chunks are not strong enough to reliably identify the broadcasting satellites. If a stopping criterion is satisfied, the process 500 proceeds to 512 and the server outputs the set of visible satellites, otherwise the process 500 returns to 504 to identify another best match.

FIG. 6 is a flow diagram of an example process 600 for selecting a set of good satellites from a set of visible satellites according to some implementations. At 602, the server receives a set of visible satellites. For instance, the set of visible satellites may be received from the mobile device or generated by the server using process 500, as described above.

At 604, the server initializes each of the visible satellites to a status of "unknown." Each visible satellite may be classified as good (i.e., a visible satellite), bad (i.e. a false identification), or unknown (i e cannot be classified as either good or bad identification). The satellites are initialized to "unknown" because due to the small size of the chunks unexpected radio interference or other noise can severely degrade the GPS signal and cause satellites to be incorrectly detected.

At 606, the server calculates a difference between the code phases of each satellite over multiple GPS samples. For example, the differences, D, in the code phase, $CP^1$ to $CP^k$, for satellites, 1 to k, as detected in two GPS samples, $n_1$ to $n_2$, may be calculated as follows:

$$D = \{CP_{n_1}^1 - CP_{n_2}^1, CP_{n_1}^2 - CP_{n_2}^2, \ldots, CP_{n_1}^k - CP_{n_2}^k\}$$

if a satellite is actually visible to the mobile device when the GPS signal is sampled the differences, D, in the code phases between the chunks is relatively small.

At 608, the server compares the differences in the code phases for each satellite to a threshold and adds the satellite to the set of "good" satellites if the difference is less than the threshold. If, however, the satellite's code phase is greater than the threshold the server may leave the satellite in the set of unknown satellites or compare the difference to a second threshold and if the difference is greater than the second threshold then add the satellite to the set of bad satellites.

Figure 7:
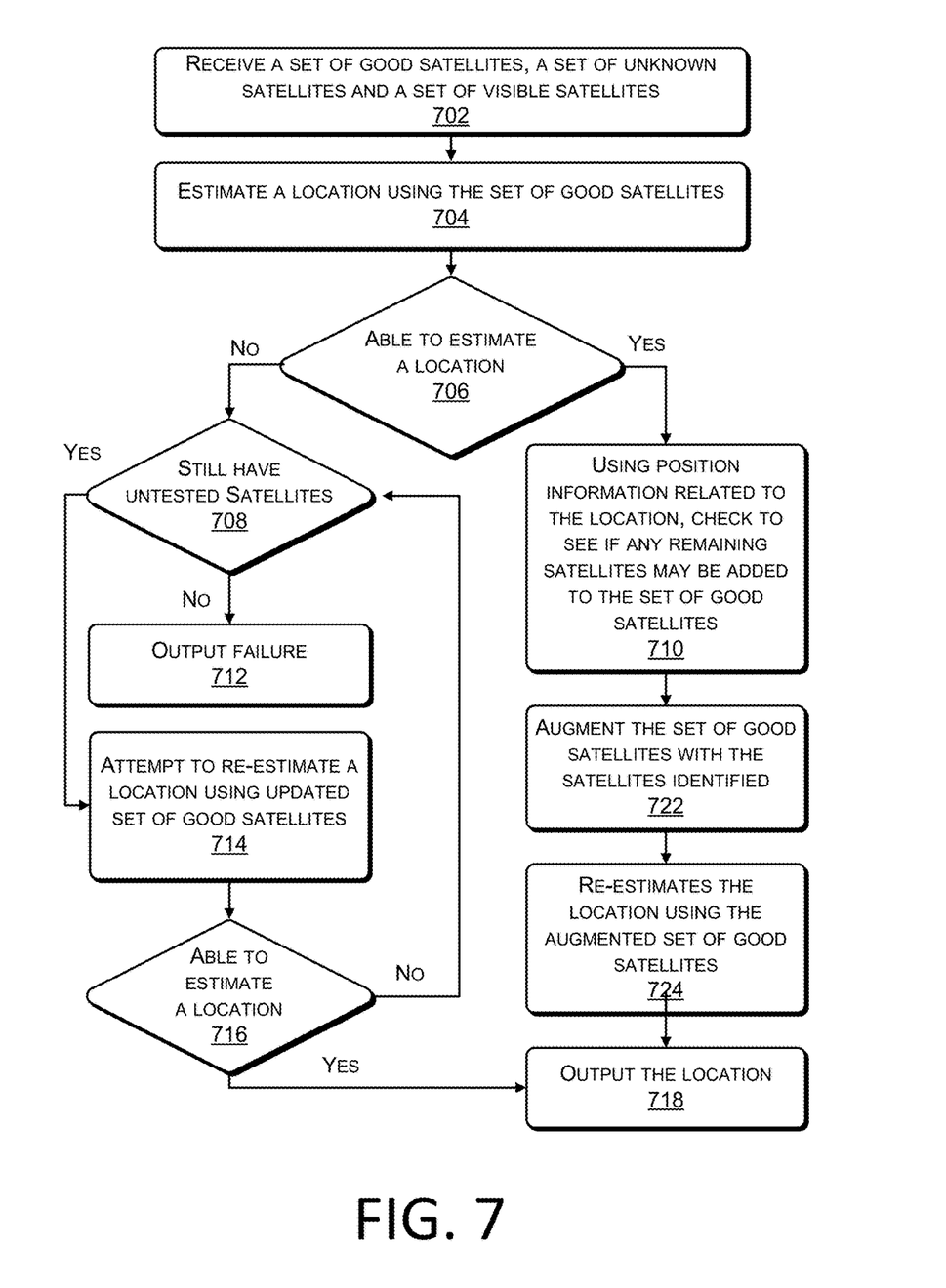
FIG. 7 is a flow diagram of an example process for estimating a location of a mobile device according to some implementations.

FIGS. 4-6 provide example processes for identifying a set of satellites from a series of GPS signal samples or chunks. FIG. 7 provides an example process for estimating a location using the set of satellites.

FIG. 7 is a flow diagram of an example process 700 for estimating a location of a mobile device according to some implementations. At 702, the server receives a set of good satellites. For instance, the set of good satellites may be determined according to the processes 500 and 600, described above. In some implementations, the server may also receive the set of unknown satellites and the set of visible satellites (i.e., the full set of satellites identified in process 500 including the satellites classified as bad).

At 704, the server estimates a location using the set of good satellites. As discussed above, the server may estimate a location based on the times that the GPS signal was sampled, the good satellites' IDs, the ephemeris and almanac data (which may be obtained from the NASA orbital database or decoded from the GPS signal samples) and the pseudoranges.

At 706, the server determines if the server is able to estimate a location from the set of good satellites. For instance, in some examples, less than the minimum number of satellites required to determine a location may have been classified as good and the location estimated may be unreliable or erroneous. If the server is unable to estimate the location the process 700 proceeds to 708 and the server adds each of the other satellites in the set of visible satellites one at a time to the set of good satellites and re-estimates the location. Otherwise, if the server was able to estimate a location the process proceeds to 710 and the server attempts to improve the accuracy of the originally estimated location by using the remaining unknown satellites.

At 708, the server determines if there are untested satellites. If there are no untested satellites and the server is still unable to estimate a location, the process 700 proceeds to 712 and the server outputs a failure (i.e., no location can be estimated from the GPS samples as received from the mobile device). If there are still untested satellites, the server temporarily adds one of the untested satellites to the set of good satellites and the process 700 proceeds to 714.

At 714, the server attempts to re-estimate a location using the updated set of good satellites. A location estimated using bad (i.e., incorrectly identified) satellites will have an erroneous, impossible or incorrect position (such as at elevations far above or below the surface of the Earth). Thus, the server tests the location estimated after adding each untested satellite to eliminate erroneous locations. For example, the server may constrain valid locations to an elevation range near the surface of the Earth, such as between 500 to 8000 m which results in the rejection of many of the locations estimated using bad satellites. In other examples, the server may access the USGS elevation API database to retrieve the true elevation of the Earth's surface for each of the locations estimated using the updated set of good satellites. By utilizing the true elevations, which can be retrieved from the USGS elevation API database, the server is able to identify both erroneous locations and actual locations of the mobile device.

At 716, if the server is able to estimate a location the process 700 proceeds to 718 and the server outputs the location as the location of the mobile device. For example, when the USGS elevation API database matches the elevation at the longitude and latitude of the location estimated using the updated set of good satellites, the server is able to estimate the location. If, however, the server is still unable to estimate a location using the updated set of good satellites, the server removes the satellite added to the set of good satellites and returns to 708 and repeats 708, 712, 714 and 716. The server continues to add untested satellites to the set of good satellites and to re-estimate locations until either no satellites remain untested or a valid location can be output.

Returning to 706, if a location was originally estimated using the set of good satellites, the process 700 proceeds to 710. At 710, the server, using position information related to the location, checks to see if any remaining satellites may be added to the set of good satellites. For example, as discussed above, the server may re-estimate the location using updated sets of good satellites and compare the elevation of the new location with an elevation retrieved from the USGS elevation API database at the longitude and latitude of the new location. In other examples, the server may compare the distance between the original location and the newly estimated location and determine that the new location is valid if the distance is less than a threshold distance.

At 722, the server augments the set of good satellites with the satellites identified. For example, the server may add some of the satellites that were originally classified as unknown to the set of good satellites based on the analysis of the position information, as discussed above.

At 724, the server re-estimates the location using the updated set of good satellites, and, at 718, the server outputs the new location as the location of the mobile device. For example, the server may output the location back to the mobile device or store the location in a database for analysis or research.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A computing device comprising:
one or more processors; and
one or more computer-readable storage devices maintaining instructions executable by the one or more processors to perform operations that include:
receiving a plurality of chunks of global positioning system (GPS) signals, wherein individual chunks of the plurality of chunks are representative of a segment of a GPS signal, wherein individual chunks of the plurality of chunks are spaced by an interval of time, and wherein each chunk of the plurality of chunks is 1 to 2 milliseconds in length;
searching for satellite specific Coarse/Acquisition (C/A) codes in the plurality of chunks over code phase and Doppler frequency combinations to identify visible satellites;
calculating, for each of the visible satellites, a difference between a first code phase and a second code phase, the first code phase associated with a first one of the plurality of chunks and the second code phase associated with a second one of the plurality of chunks;
identifying a first satellite from the plurality of GPS signal chunks by searching for satellite specific Coarse/Acquisition (C/A) codes in each GPS signal chunk of the plurality of GPS signal chunks over code phase and Doppler frequency combinations;
remove signals associated with the first satellite from the plurality of GPS signal chunks by performing a projection onto an appropriate signal subspace determined by C/A code templates of the identified first satellite;
adding each visible satellite for which the difference is less than a threshold difference to a set of satellites; and
estimating a location based on the set of satellites.

2. The computing device as recited in claim 1, wherein:
adding a visible satellite to the set of satellites is based at least partly on data related to the location; and
the operations further comprise re-estimating the location based in part on the added satellites.

3. The computing device as recited in claim 1, wherein the searching for the satellite specific C/A codes is performed independently on each chunk of the plurality of chunks.

4. The computing device as recited in claim 1, wherein each chunk of the plurality of chunks is 1 millisecond in length.

5. The computing device as recited in claim 1, wherein the location is estimated based on the time over which the plurality of chunks were collected, the set of satellites, ephemeris data, and pseudorange data related to each satellite of the set of satellites.

6. The computing device as recited in claim 1, wherein the searching for the satellite specific C/A codes is performed iteratively until a stopping criteria is achieved.

7. The computing device as recited in claim 6, wherein the stopping criteria is at least one of:
a predetermined number of iterations; or
the computing device is unable to identify any additional satellites from the chunk.

8. A computer-readable storage device storing instructions that, when executed by one or more processors, cause the one or more processors to:
receive data related to a plurality of satellites identified from a plurality of global positioning system (GPS) signal chunks, wherein:

individual chunks of the plurality of GPS signal chunks comprise a portion of a GPS signal sample of a plurality of GPS signal samples, the data includes a plurality of code phases, each of the plurality of code phases is associated with one of the plurality of satellites and one of the plurality of GPS signal chunks, individual chunks of the plurality of GPS signal chunks are spaced by intervals of time, individual ones of the intervals of time are not equal, and individual chunks of the plurality of chunks include a time over which the individual chunk was sampled;

calculate, for each satellite of the plurality of satellites, differences between individual code phases of the plurality of code phases for each of the plurality of GPS signal chunks;

determine that a majority of the differences for a satellite of the plurality of satellites is less than a threshold difference;

add the satellite to a set of satellites;

receive the plurality of GPS signal chunks;

identify a first satellite from the plurality of GPS signal chunks by searching for satellite specific Coarse/Acquisition (C/A) codes in each GPS signal chunk of the plurality of GPS signal chunks over code phase and Doppler frequency combinations;

remove signals associated with the first satellite from the plurality of GPS signal chunks by performing a projection onto an appropriate signal subspace determined by C/A code templates of the identified first satellite; and output the set of satellites.

9. The computer-readable storage device as recited in claim 8, further comprising instructions which, when executed by the one or more processors, cause the one or more processors to:

receive the plurality of GPS signal chunks; and identify a second satellite from the plurality of GPS signal chunks by re-searching for the satellite specific C/A codes in each GPS signal sample of the plurality of GPS signal samples over the code phase and Doppler frequency combinations, wherein the data related to the plurality of satellites is data related to the first satellite and the second satellite.

10. The computer-readable storage device as recited in claim 8, wherein the plurality of GPS signal chunks are 1 millisecond to 2 milliseconds in length.

11. The computer-readable storage device as recited in claim 8, further comprising instructions which, when executed by the one or more processors, cause the one or more processors to:

estimate a first location based on the set of satellites.

12. The computer-readable storage device as recited in claim 11, further comprising instructions which, when executed by the one or more processors, cause the one or more processors to:

determine that the differences between individual code phases of the plurality of code phases for an additional satellite of the plurality of satellites are greater than the threshold difference;

adding the additional satellite to the set of satellites based on data related to the first location;

estimate a second location based in part on the additional satellite; and output the second location.

13. A method comprising:

receiving a first global positioning system (GPS) signal chunk and a second GPS signal chunk, the first GPS signal chunk and the second GPS signal chunk spaced by an interval of time, and wherein the first GPS signal chunk and the second GPS signal chunk are each representative of a segment of a GPS signal, each of first GPS signal chunk and the second GPS signal chunk includes a time over which the individual chunk was collected;

identifying a first satellite from the first GPS signal chunk by searching for satellite specific Coarse/Acquisition (C/A) codes in the first GPS signal chunk over code phase and Doppler frequency combinations;

adding the first satellite to a set of satellites;

removing signals associated with the first satellite from the first GPS signal chunk by performing a projection onto an appropriate signal subspace determined by C/A code templates of the identified first satellite;

identifying a second satellite from the first GPS signal chunk by searching for the satellite specific C/A codes in the first GPS signal chunk over the code phase and Doppler frequency combinations;

adding the second satellite to the set of satellites; and outputting the set of satellites.

14. The method as recited in claim 13, further comprising:

removing signals associated with the second satellite from the first GPS signal chunk;

identifying a third satellite from the first GPS signal chunk by searching for the satellite specific C/A codes in the first GPS signal chunk over the code phase and Doppler frequency combinations; and adding the third satellite to the set of satellites before outputting the set of satellites.

15. The method as recited in claim 13, further comprising:

identifying a first additional satellite from the second GPS signal chunk by searching for the satellite specific C/A codes in the second GPS signal chunk over the code phase and Doppler frequency combinations;

adding the first satellite identified in the second GPS signal chunk to a second set of satellites;

removing signals associated with the first satellite identified in the second GPS signal chunk from the second GPS signal chunk;

identifying a second satellite from the second GPS signal chunk by searching for the satellite specific C/A codes in the GPS signal chunk over the code phase and Doppler frequency combinations;

adding the second satellite identified in the second GPS signal chunk to the set of satellites; and outputting the second set of satellites.

16. The method as recited in claim 15, further comprising:

determining a difference between a first code phase associated the first GPS signal chunk and a second code phase associated with the second GPS signal chunk, the first and second code phases associated with one satellite;

comparing the difference to a threshold difference;

determining that the difference is less than the threshold difference; and estimating a location based at least in part on data related to the first satellite.

17. The method as recited in claim 15, wherein the first satellite identified in the first GPS signal chunk is the same as the first additional satellite identified in the second GPS signal chunk.

18. The method as recited in claim 13, wherein the first GPS signal chunk and the second GPS signal chunk are 1 millisecond to 2 milliseconds in length.

19. The method as recited in claim 13, wherein the signals associated with the first satellite are detected and removed from the GPS signal chunk by performing a matching pursuit calculation.

20. The method as recited in claim 13, wherein the signals associated with the first satellite are detected and removed from the GPS signal chunk by performing an orthogonal matching pursuit calculation.

* * * * *